May 19, 1931. R. HOFSTETTER 1,806,202
APPARATUS FOR ASSEMBLING MEMBERS
Filed Feb. 15, 1927 12 Sheets-Sheet 1
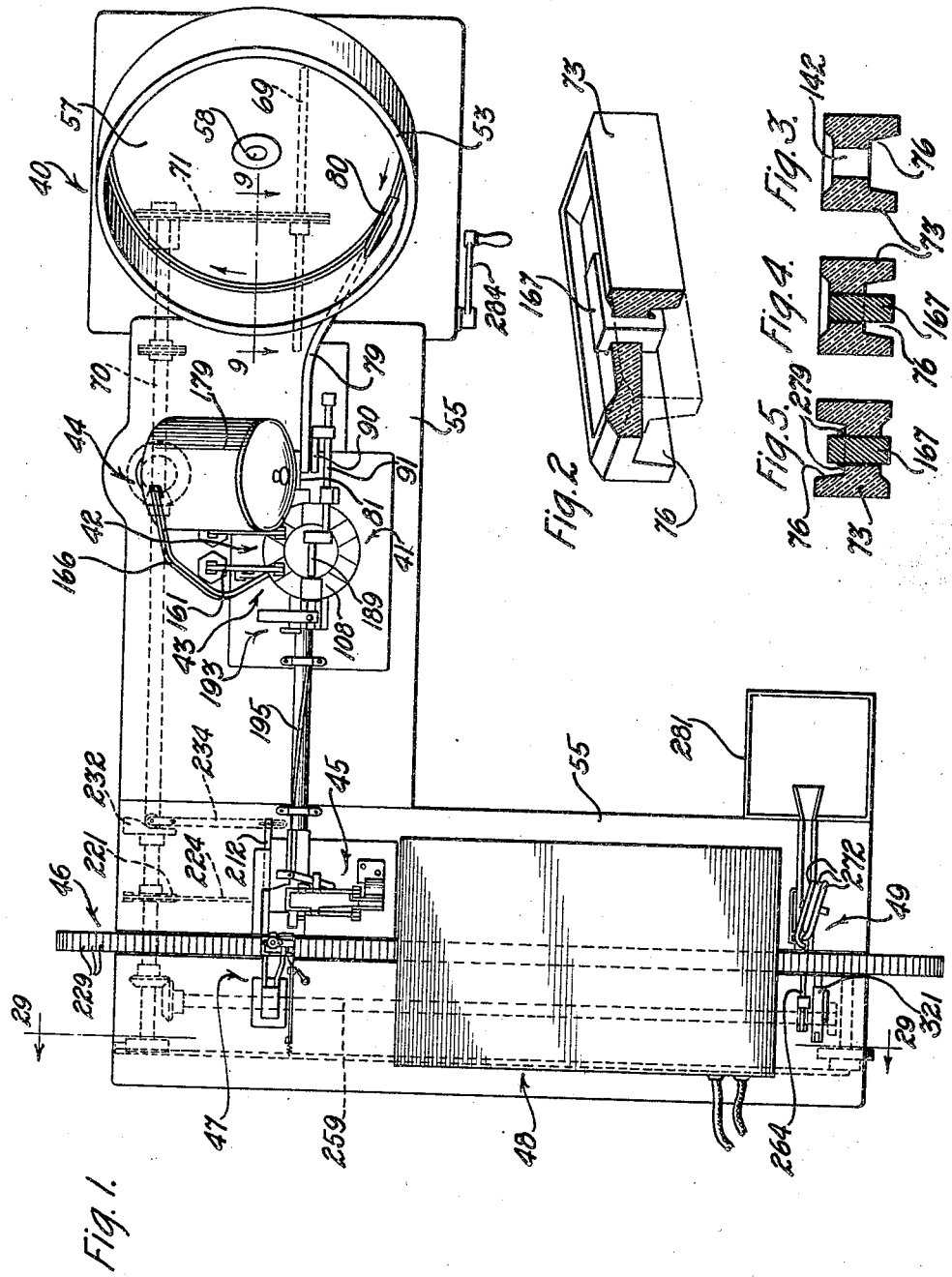
Inventor
Robert Hofstetter
by [signature] Att'y.

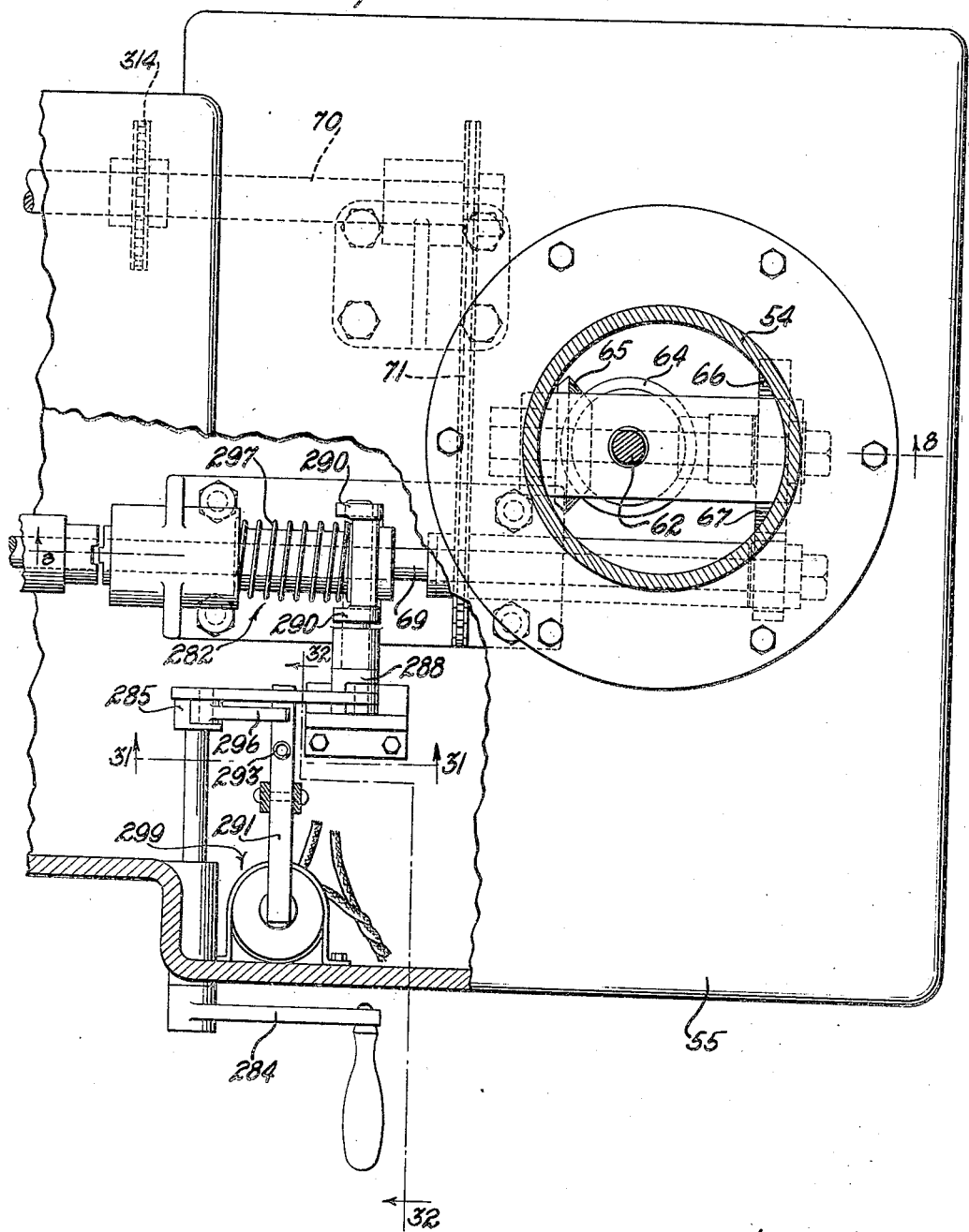

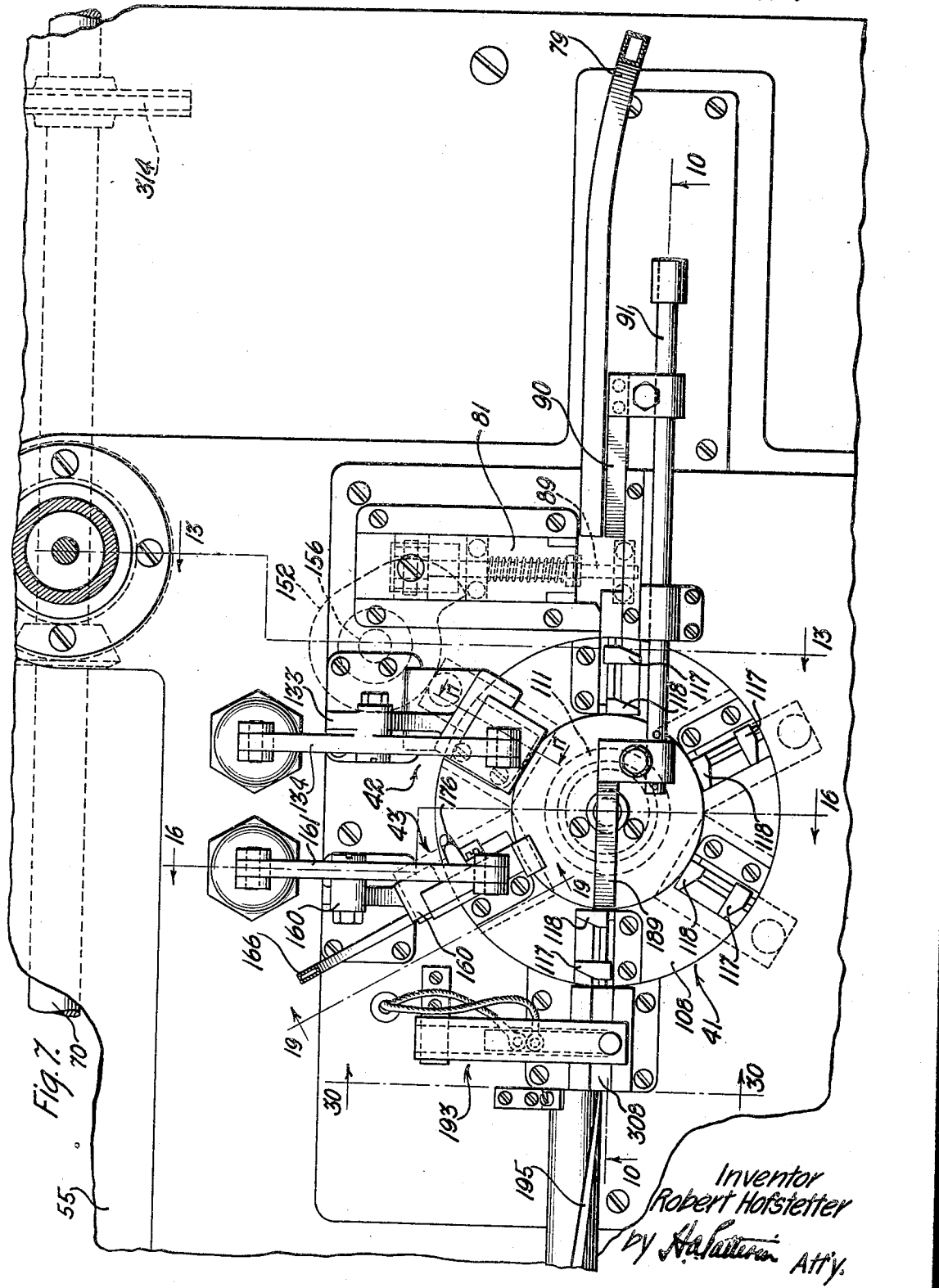

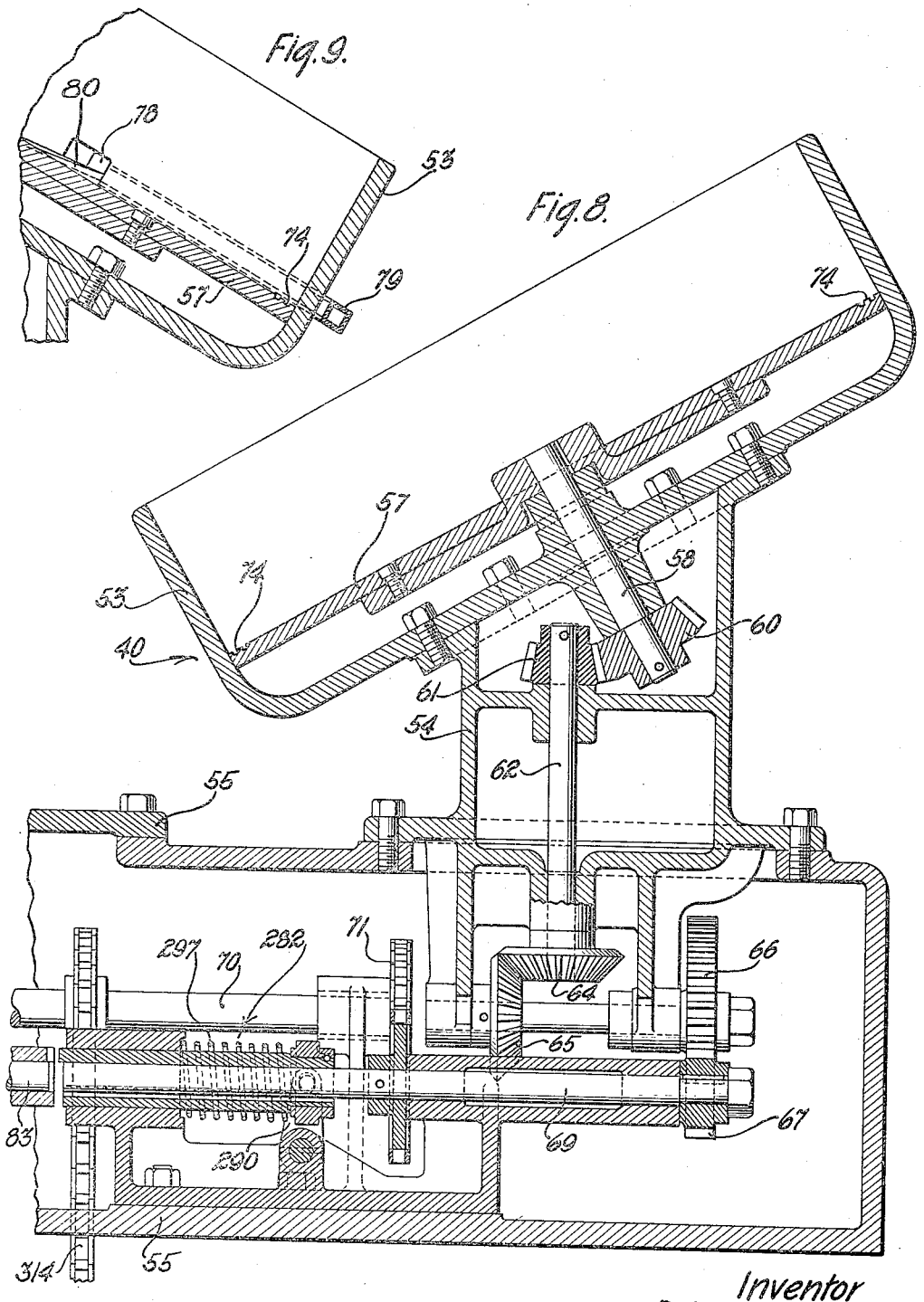

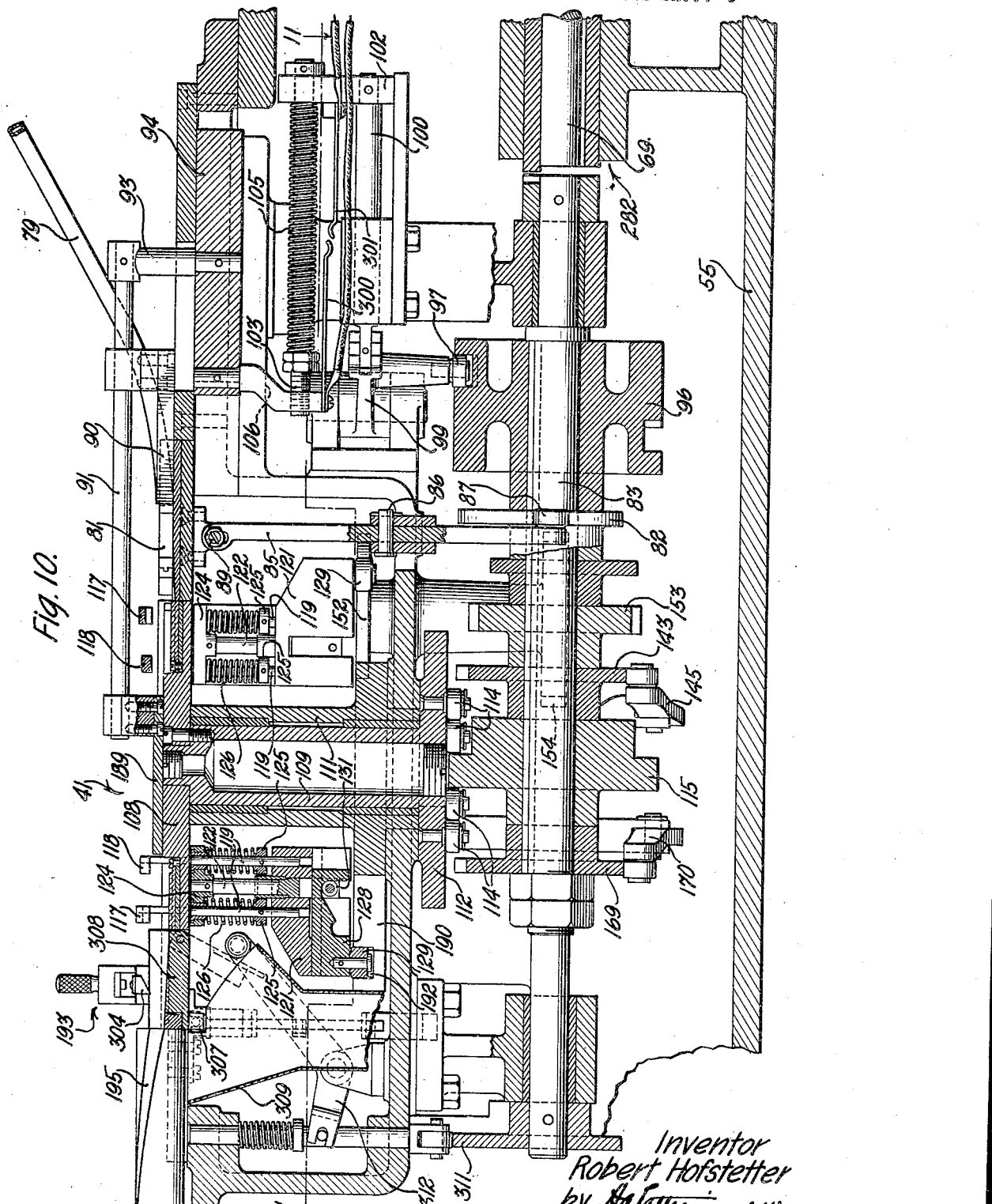

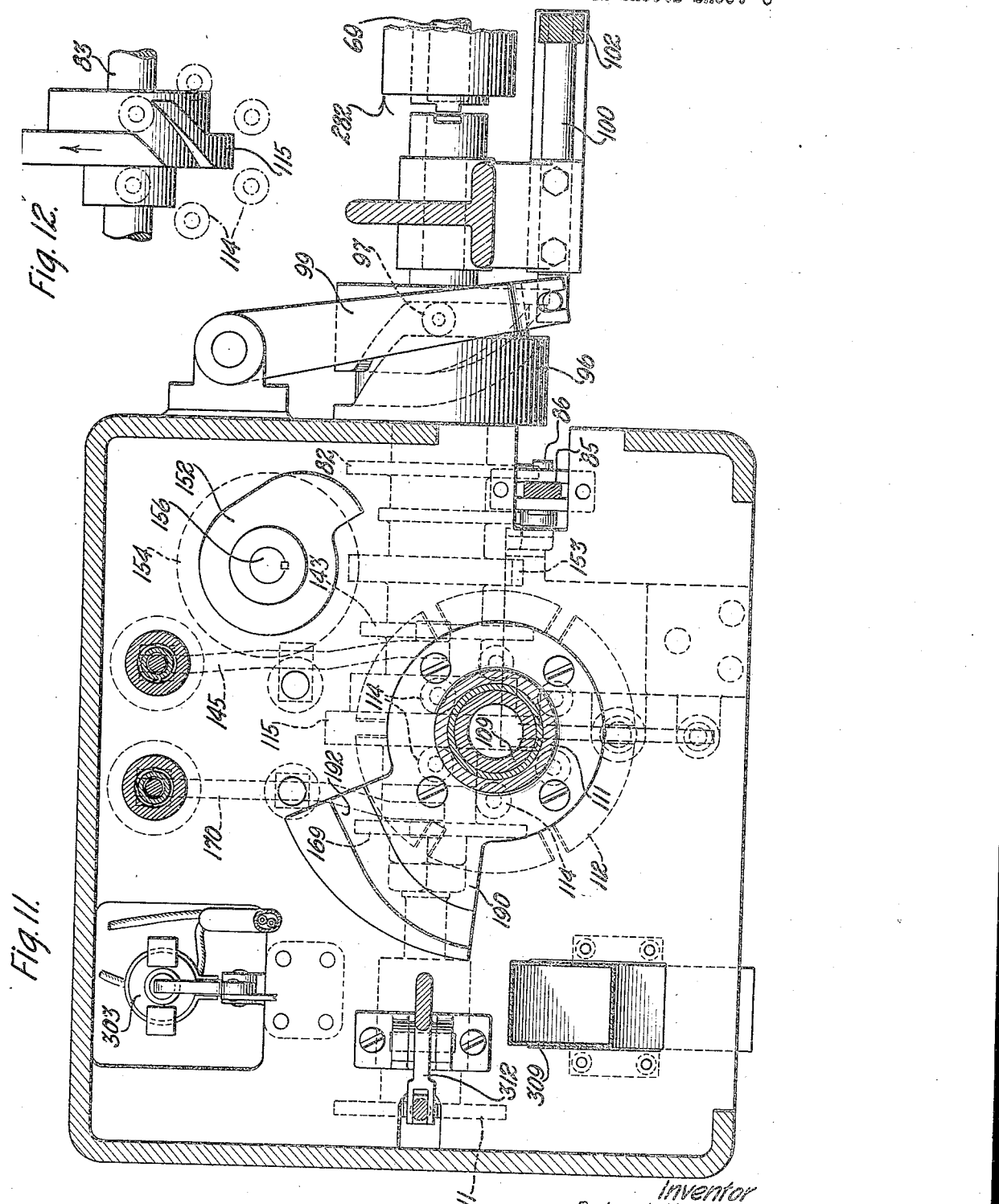

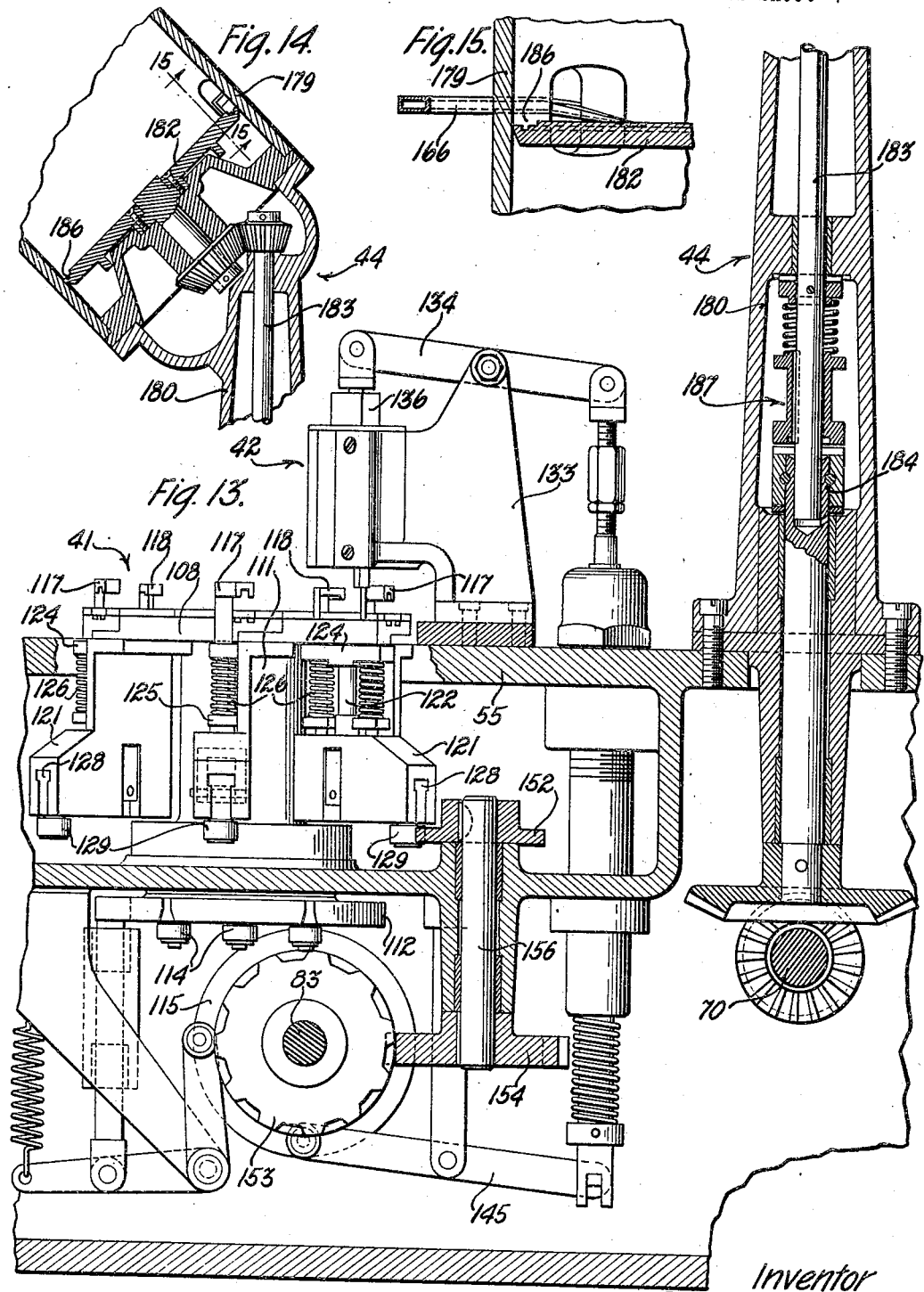

May 19, 1931.  R. HOFSTETTER  1,806,202
APPARATUS FOR ASSEMBLING MEMBERS
Filed Feb. 15, 1927   12 Sheets-Sheet 8
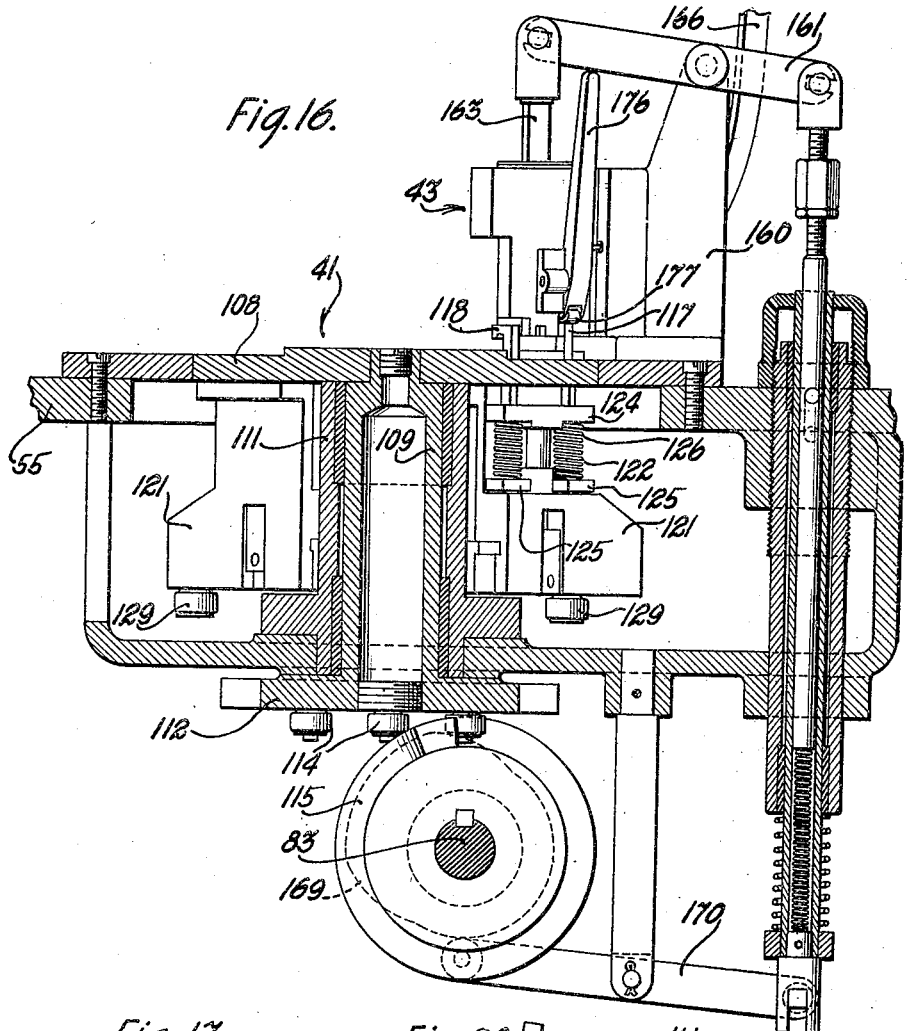
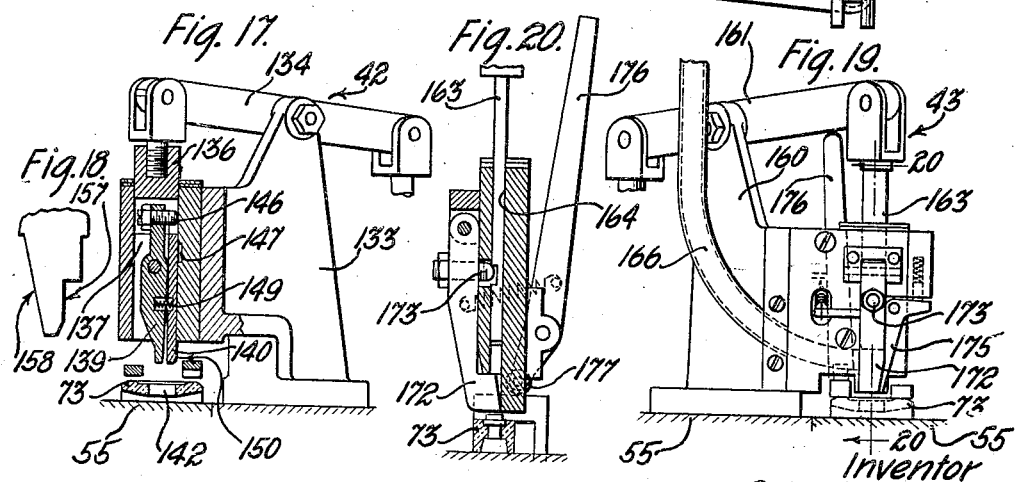
Inventor
Robert Hofstetter
by *Ha Patterson* Att'y.

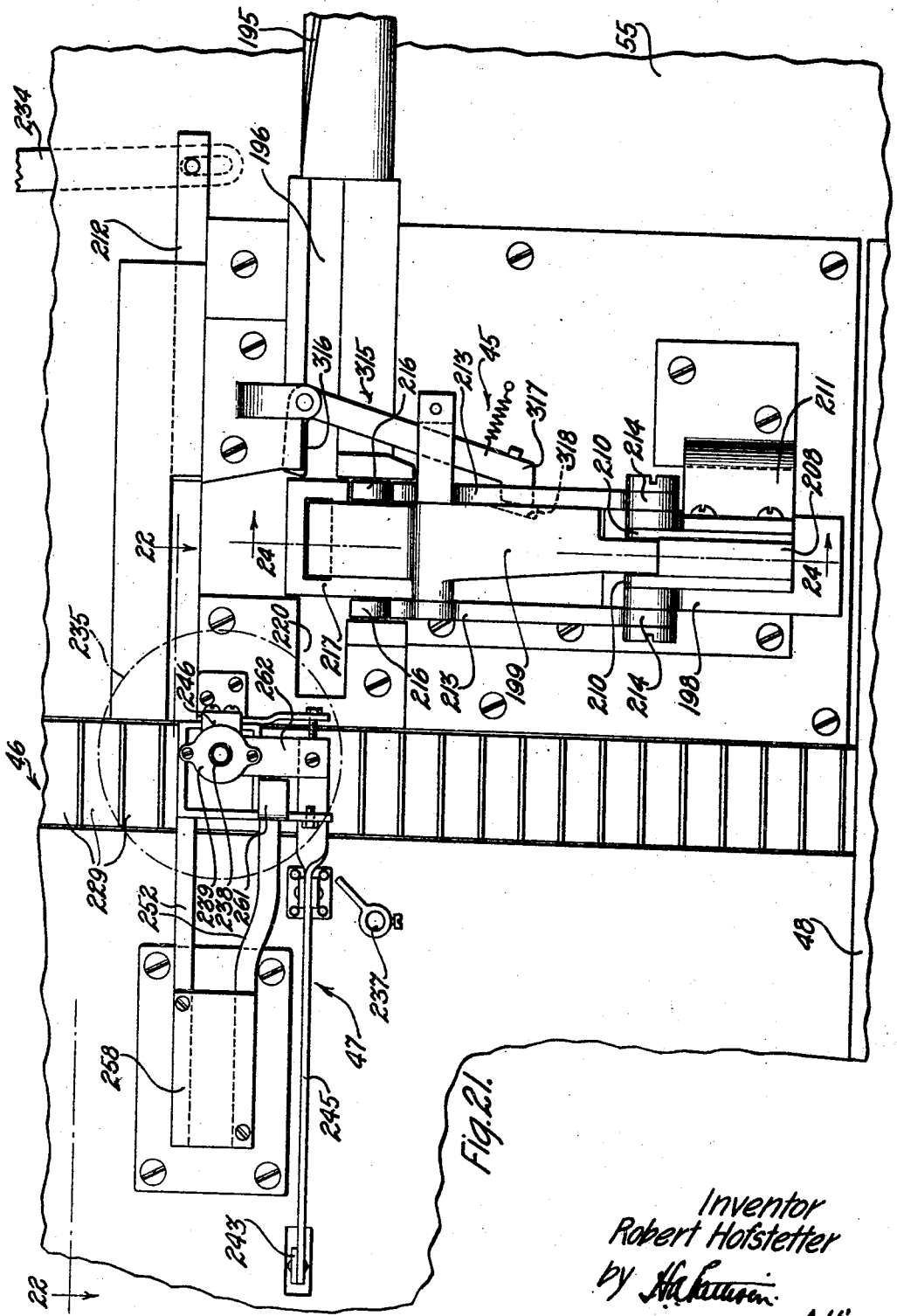

May 19, 1931.  R. HOFSTETTER  1,806,202
APPARATUS FOR ASSEMBLING MEMBERS
Filed Feb. 15, 1927  12 Sheets-Sheet 10
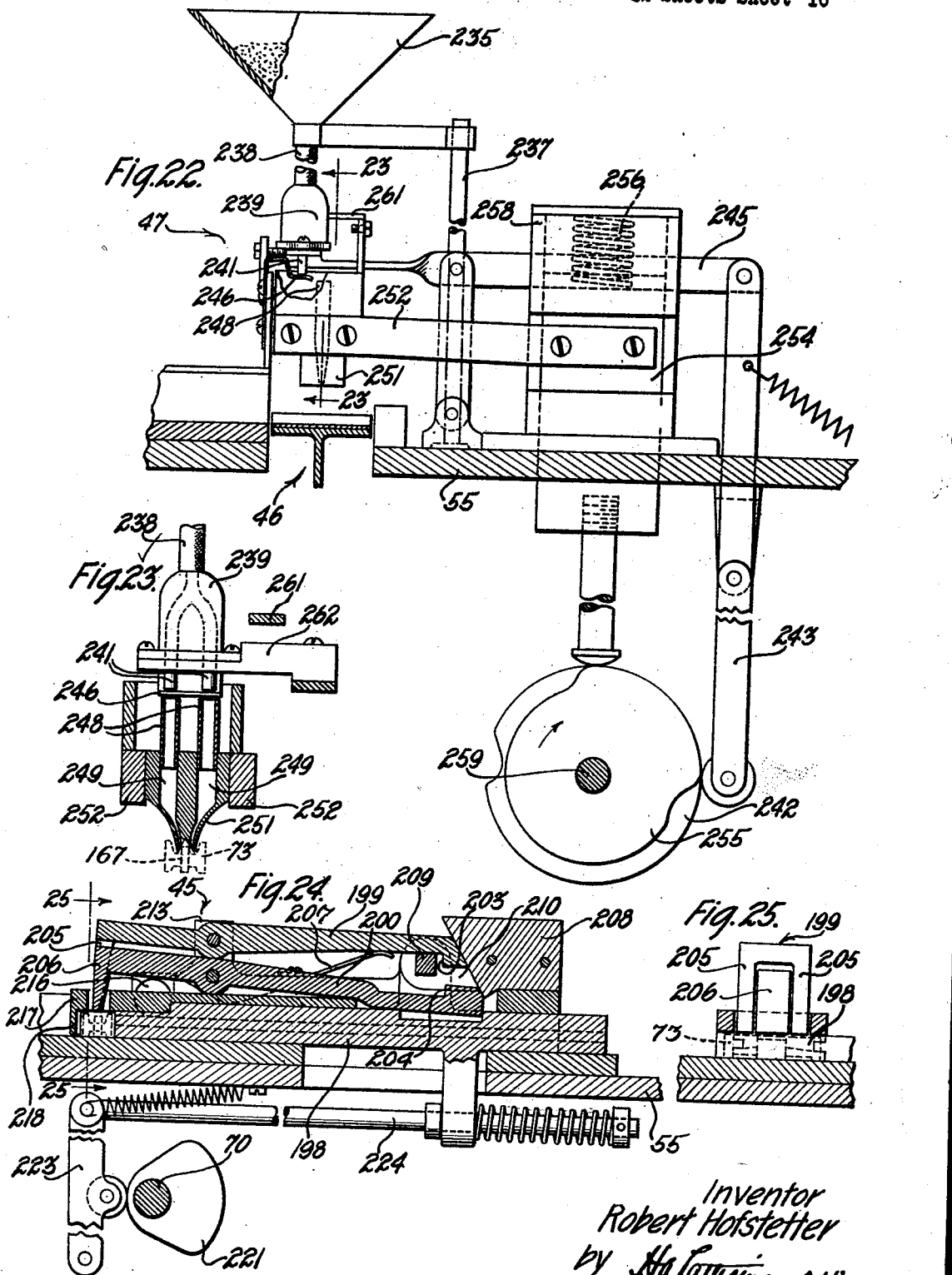

May 19, 1931.  R. HOFSTETTER  1,806,202
APPARATUS FOR ASSEMBLING MEMBERS
Filed Feb. 15, 1927   12 Sheets-Sheet 11
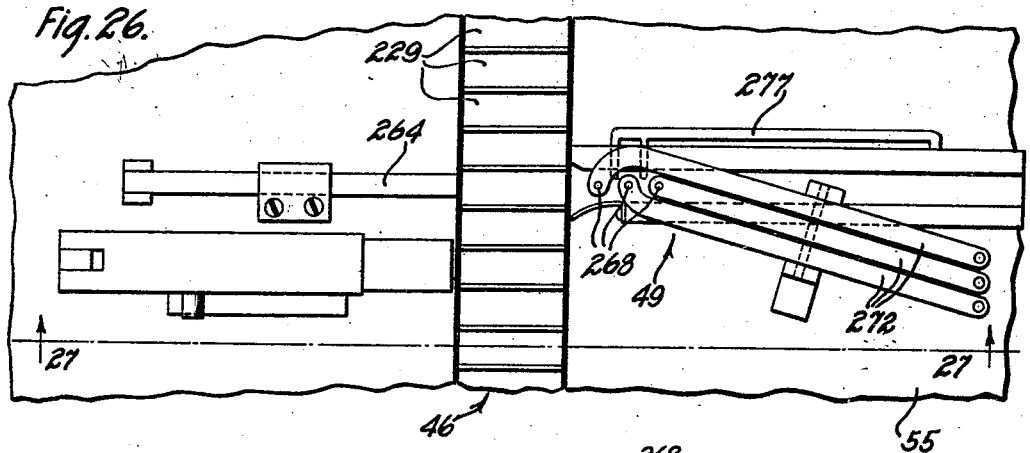
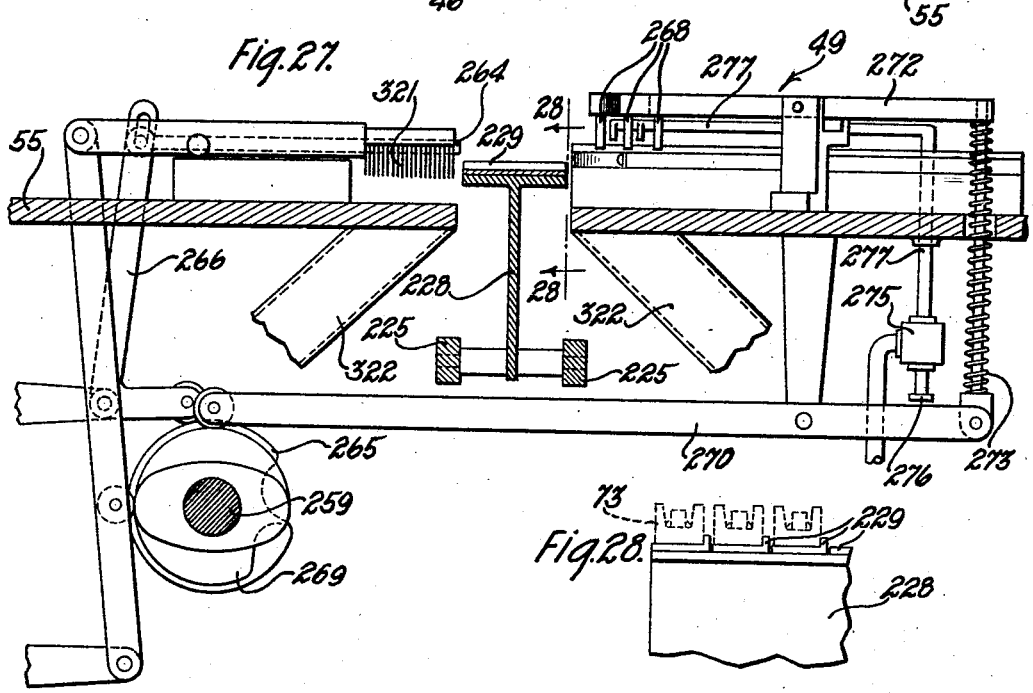

May 19, 1931.  R. HOFSTETTER  1,806,202
APPARATUS FOR ASSEMBLING MEMBERS
Filed Feb. 15, 1927  12 Sheets-Sheet 12
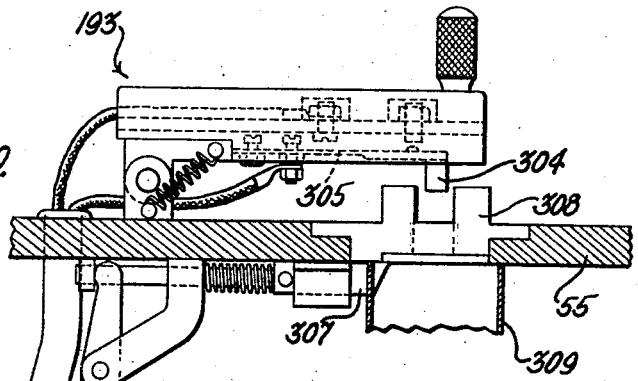
Fig. 30.
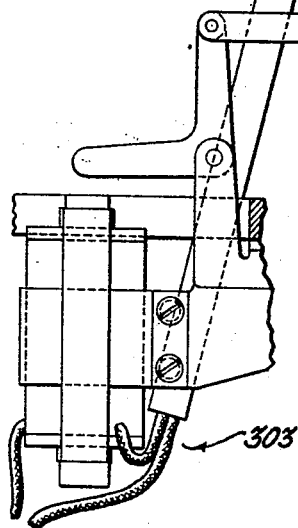
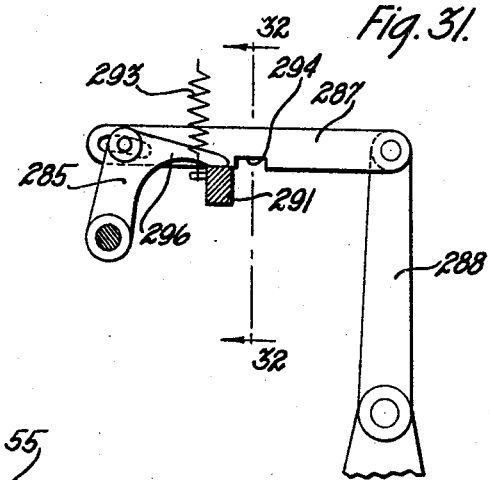
Fig. 31.
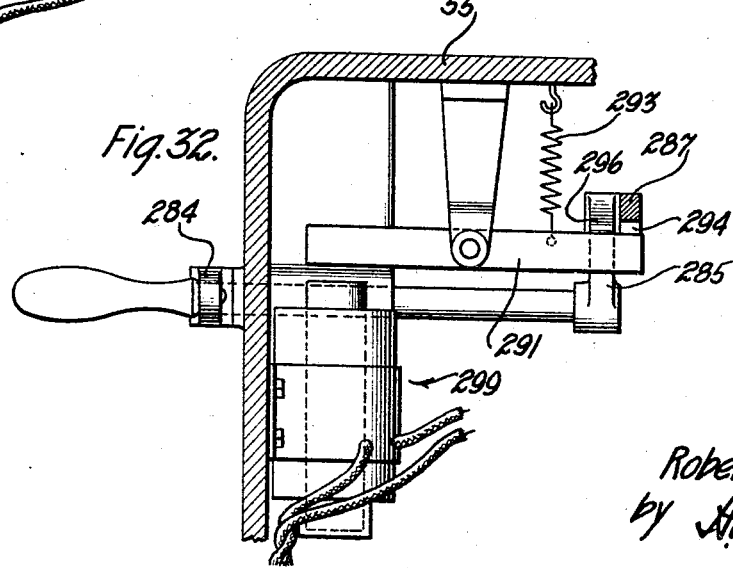
Fig. 32.
Inventor
Robert Hofstetter
by [signature] Att'y.

Patented May 19, 1931

1,806,202

UNITED STATES PATENT OFFICE

ROBERT HOFSTETTER, OF DOWNERS GROVE, ILLINOIS, ASSIGNOR TO WESTERN ELECTRIC COMPANY, INCORPORATED, OF NEW YORK, N. Y., A CORPORATION OF NEW YORK

APPARATUS FOR ASSEMBLING MEMBERS

Application filed February 15, 1927. Serial No. 168,313.

This invention relates to methods of and apparatus for assembling members, and more particularly to apparatus for assembling protector block parts.

This invention is particularly applicable in assembling the members constituting protector blocks of the type used in open space cutouts, commonly employed in electrical circuits used in telephone systems as a means for protecting other apparatus against abnormal current surges. Such a protector block comprises an apertured block of non-conductive material such as porcelain and a conducting electrode of carbon inserted within the aperture of the block, this carbon insert being secured in position by means of suitable bonding or cementing material. In order to effectively assemble these protector block parts, care must be exercised to properly insert the carbon electrodes within companion porcelain blocks and the bonding material must be applied to a predetermined, localized area and subjected to a proper heat treatment.

The primary object of this invention is to provide an improved apparatus for advancing members from a source of supply and assembling them in an efficient and economical manner.

To attain this and other objects and in accordance with the general features of the invention, an apparatus is provided which includes means for receiving an indiscriminately arranged supply of apertured porcelain blocks for feeding individual blocks to a predetermined position upon an indexing mechanism which advances them to a positioning station and subsequently indexes them to an inserting mechanism which causes the insertion of a carbon electrode within the aperture of each positioned block. Only such blocks as are properly provided with carbon inserts are then transferred to an endless conveyor and thereby advanced to a cement supplying station and thence through a heating furnace for fusing the cementing material. As the parts emerge from the furnace, each carbon insert is straightened with respect to its companion block and the cementing material is contemporaneously cooled so as to provide a firm bond between the associated parts. Thus it will be understood that by means of this apparatus the entire assembly operation is automatically controlled and protector block parts are assembled in continuous, successive order.

These and other objects and features of the invention will be more apparent from the following detailed description when considered in connection with the accompanying drawings illustrating an assembling apparatus embodying the features of the invention, in which Fig. 1 is a plan view of an assembling apparatus which is representative of one embodiment of the invention;

Fig. 2 is a perspective view of an assembled protector block of the type adapted to be assembled by the apparatus disclosed in Fig. 1;

Figs. 3, 4, and 5 are vertical, transverse sections of a porcelain protector block similar to the one disclosed in Fig. 2, disclosing the relative positions of the parts at various stages in the assembly operation;

Fig. 6 is a fragmentary plan view of the receiving end of the assembling apparatus with the supply hopper removed and a portion of the machine frame broken away to disclose parts otherwise hidden;

Fig. 7 is a fragmentary plan view disclosing in detail the indexing portion of the apparatus;

Fig. 8 is a vertical sectional view of the porcelain block hopper and driving mechanism therefor taken on the line 8—8 of Fig. 6;

Fig. 9 is a fragmentary, detailed, sectional view of the porcelain block hopper taken on the line 9—9 of Fig. 1;

Fig. 10 is a vertical, sectional view taken longitudinally of the apparatus on line 10—10 of Fig. 7;

Fig. 11 is a horizontal, sectional view taken on the line 11—11 of Fig. 10;

Fig. 12 is an elevational view of the indexing or switching cam mechanism;

Fig. 13 is a fragmentary, transverse, vertical, sectional view taken on the line 13—13 of Fig. 7;

Fig. 14 is a central, vertical, sectional view of the carbon insert hopper which forms a continuation of the hopper support disclosed in Fig. 13;

Fig. 15 is a fragmentary, detailed, sectional view of the carbon insert hopper taken on the line 15—15 of Fig. 14;

Fig. 16 is a fragmentary, transverse, vertical, sectional view taken on the line 16—16 of Fig. 7;

Fig. 17 is a detailed, vertical, sectional view of the porcelain block positioning mechanism or station taken on the line 17—17 of Fig. 7;

Fig. 18 is a fragmentary, elevational view of the lower extremity of one of the positioning fingers as viewed from the left of Fig. 17;

Fig. 19 is an elevational view of the carbon electrode inserting mechanism or station viewed as on the line 19—19 of Fig. 7;

Fig. 20 is a detailed, vertical section taken on the line 20—20 of Fig. 19;

Fig. 21 is an enlarged plan view of the transfer and cementing mechanisms as disclosed in Fig. 1, the cement hopper being removed to more clearly disclose mechanisms therebeneath;

Fig. 22 is a vertical, sectional view taken on the line 22—22 of Fig. 21, disclosing an elevational view of the cementing mechanism or station;

Fig. 23 is a fragmentary, detailed, sectional view of the cementing mechanism taken on the line 23—23 of Fig. 22;

Fig. 24 is a vertical, sectional view taken longitudinally of the transfer mechanism on the line 24—24 of Fig. 21;

Fig. 25 is a vertical, sectional view taken on the line 25—25 of Fig. 24;

Fig. 26 is an enlarged plan view of the insert straightening and cement cooling mechanism at the delivery end of the apparatus;

Fig. 27 is a vertical, sectional view taken on the line 27—27 of Fig. 26;

Fig. 28 is a fragmentary, side elevational view of a portion of the conveyor chain as viewed on the line 28—28 of Fig. 27;

Fig. 29 is a sectional view of the intermittent drive for the conveyor chain taken on the line 29—29 of Fig. 1, the conveyor proper being shown in dotted lines;

Fig. 30 is a fragmentary, vertical, sectional view of the electrically controlled ejector mechanism taken on the line 30—30 of Fig. 7;

Fig. 31 is a fragmentary, vertical, sectional view of the clutch control mechanism taken on the line 31—31 of Fig. 6, and Fig. 32 is a fragmentary, sectional view of the clutch control mechanism taken on the line 32—32 of Fig. 6.

Referring now to the drawings wherein like numerals have been employed to designate similar parts throughout the various figures, it is to be understood that the general arrangement of the protector block assembly machine as disclosed in Fig. 1 comprises a combination of several principal parts as follows: A porcelain block supplying mechanism 40, an indexing mechanism 41, a porcelain block positioning station 42, a carbon inserting mechanism or station 43, a carbon insert supply mechanism 44 associated with the inserting station, a protector block transfer mechanism 45, an endless conveyor 46, a cement supply station 47, an electric heating furnace 48, an insert straightening and cement cooling station 49, and other mechanisms for controlling and facilitating the operation of the machine. In accordance with this arrangement and with the view of clearly describing the functional characteristics of the invention, the principal parts of the machine will be described in their above mentioned order and this description will be followed by a general statement of the operation of the machine.

The porcelain block supplying mechanism 40 comprises an inclined hopper 53 (Fig. 8) secured at the upper end of a suitable frame 54 mounted upon a machine frame 55. A rotatable circular receiving plate 57 within the hopper 53 is secured at the upper end of an inclined shaft 58, the lower end of which supports a bevel gear 60 which meshes with a companion gear 61 mounted upon a vertical shaft 62. Rotation is imparted to this shaft 62 through the medium of bevel gears 64 and 65 and spur gears 66 and 67, the gear 67 being mounted upon a horizontal drive shaft 69 which is driven from a main drive shaft 70 through a chain belt 71 reaching between these shafts. The receiving plate 57 is designed to receive an indiscriminately arranged supply of porcelain blocks 73 of the type disclosed in Figs. 2 to 5 inclusive. An annular track or guiding ridge 74 provided in the receiving plate 57 is designed to receive and guide the blocks 73 which become properly positioned within the hopper. Thus when a block 73 is urged toward the margin of the receiving plate 57, a recess 76 extending longitudinally of the block eventually associates itself with the track 74. This block will be carried in a circular path upon the track to an opening 78 (Fig. 9) in the wall of the hopper 53 which forms the entrance to a chute 79. A guide 80 serves to receive properly positioned blocks as they approach the opening 78 and guide the blocks into the chute 79. The continued rotation of the plate 57 sufficiently agitates the indiscriminately arranged supply of blocks associated therewith with the result that blocks are readily carried into seated relation with respect to the track 74 and hence fed in a continuous stream through the chute 79.

Referring to Figs. 1, 7, and 10, it will be observed that the lower end of the chute 79 terminates at the forward end of a horizontally slidable ram 81. This ram 81 is operatively connected with a cam 82 carried by a horizontal drive shaft 83, this drive shaft being connected with the shaft 69 through a clutch mechanism later to be described. The ram 81 is operatively connected with the cam 82 by means of a vertical lever 85 pivoted at 86 and carrying a roller 87 which engages with the surface of the cam 82. The upper end of the lever 85 is connected with one extremity of a horizontal rod 89 which is secured at its opposite extremity to the bottom of the ram 81 and it will be clear that upon each rotation of the cam 82 the ram 81 will be reciprocated, thereby carrying a porcelain block delivered from the chute 79 into operative association with the forward extremity of a slidable shifter bar 90. This shifter bar 90 is secured to a horizontal shifter rod 91 which is supported at one extremity by a pin 93 (Fig. 10) mounted upon a slidable carriage 94. Reciprocation is imparted to the carriage 94 through the operation of a cylindrical cam 96 mounted upon the shaft 83 as clearly shown in Figs. 10 and 11. A roller 97 engaging with the surface of the cam 96 is supported by a depending portion of a pivoted arm 99, the free extremity of this arm being connected at one end of a slidable rod 100. The other end of the rod 100 supports an upright block 102, the upper end of which slidably supports a rod 103 and encircling the rod 103 is a coil spring 105. The forward extremity of the rod 103 is secured to a pin depending from and secured to the carriage 94, and it is to be understood that upon the forward movement of the rod 100 (to the left of Fig. 10) the block 102 will act against the spring 105, thereby effecting the forward movement of the carriage 94 and the shifter bar 90. This forward movement of the shifter bar 90 causes the porcelain block advanced by the ram 81 to be delivered to the indexing mechanism 41.

This indexing mechanism 41 includes a horizontal, circular indexing plate 108 which is centrally secured to the upper end of a hollow, vertically disposed shank 109 (Fig. 10) revoluble within an upright bearing support 111 suitably mounted upon the machine frame 55. The lower extremity of the hollow shank 109 is enlarged so as to present a flange 112 for supporting six rollers 114 equally spaced in a circular path about the axis of the shank. Intermittent rotation is imparted to the indexing plate 108 by means of a switching or indexing cam 115 (Figs. 10 to 12 inclusive) which is keyed to the drive shaft 83. Upon each rotation of the switching cam 115 one of the rollers 114 is engaged and advanced thereby so as to impart one-sixth of a revolution to the indexing plate 108.

As a porcelain block 73 is delivered to the indexing plate 108 by the shifter bar 90 it is advanced beneath a pair of clamping fingers 117 and 118 which are supported at the upper extremity of a pair of slidable pins 119 (Fig. 10). These pins 119 are slidably mounted within a housing 121 which is suitably secured to the underside of the indexing plate 108 and vertically slidable within the housing 121 intermediate the pins 119 is a rod 122, the upper end of which supports a cross head 124. The cross head 124 is slidable upon the pins 119 and interposed between the cross head and a collar 125 secured to each of the pins 119 is a coil spring 126. Within the housing 121 and slidable radially with respect to the center of the hollow shank 109 is a cam block 128 which supports a roller 129 and is provided with a cam surface for engagement with a roller 131 carried at the lower end of the slidable rod 122. From this description it will be understood that when the cam block 128 assumes its outermost position as clearly shown in Fig. 10, the clamping fingers 117 and 118 will have been moved to their uppermost position, and it will be equally clear that when the cam block 128 is moved inwardly, the cross head 124 is carried downwardly, thereby compressing the springs 126 and effecting the downward movement of the clamping fingers 117 and 118. After a porcelain block has been fed beneath the clamping fingers 117 and 118, the switching cam 115 operates to index the plate 108 so as to carry the associated porcelain block into operative association with the positioning station 42.

The positioning station 42 (Figs. 7, 13, 17, and 18) includes a bracket member 133 suitably secured on the upper portion of the machine frame 55. Pivotally mounted on the bracket 133 is a rocker arm 134, one end of which carries a block 136 which is vertically slidable within a guideway 137 provided in the bracket 133. Pivoted to the block 136 within the guideway 137 is a positioning finger 139 which cooperates with a companion finger 140 formed integrally with the block 136. As the porcelain block 73 is indexed it is carried beneath the positioning fingers 139 and 140, as clearly shown in Fig. 17, with a central aperture 142 of the block 73 positioned immediately beneath and in substantial registration with the fingers 139 and 140. When the block has been indexed to the above mentioned position the positioning fingers begin to move downwardly, this movement being occasioned by the operation of a cam 143 (Figs. 10 and 13) keyed to the shaft 83 which causes the actuation of a rocker arm 145 operatively connected with one extremity of the rocker arm 134. As the positioning fingers are inserted within the aperture 142, a stud 146 and the upper end of the finger 139 is carried into association with a recess 147, and a spring 149 interposed between the fingers 139 and 140 causes a movement of the finger 139 which is sufficient to engage the surface of the block 73 at one end of the aperture 142 and thereby insures the engagement of the surface of the block at the opposite extremity of the aperture with a fixed surface 150 on the finger 140 (Fig. 17). In Fig. 18 an enlarged view of the lower portions of the positioning fingers as viewed from the left of Fig. 17 is shown, and it will be observed that a vertical surface 157 is disposed oppositely from an inclined surface 158. As the fingers are lowered in the aperture 142, the inclined surface 158 engages with one of the side surfaces of the block within the aperture and causes the block to be properly positioned laterally with the vertical surface 157 engaging the opposite side surface within the aperture 142. Thus it will be clear that the fingers 139 and 140 serve to properly position the aperture of the porcelain block 73 with respect to the two fixed vertical surfaces 150 and 157. At this instance a cam 152 (Figs. 7, 10, and 13) engages the roller 129 carried by the cam block 128 provided with the clamping fingers 117 and 118 now positioned immediately above the porcelain block 73. The operation of the cam 152 causes the roller 129 engaged thereby to be moved inwardly, thereby effecting the downward movement of the clamping fingers 117 and 118 so as to yieldingly clamp the properly positioned porcelain block in position upon the indexing plate 108. The cam 152 is operatively connected with the drive shaft 83 by means of a helical gear 153 which meshes with a companion gear 154 keyed to the lower end of a vertical shaft 156, a complete rotation being imparted to the cam 152 during each period of indexing. Upon the clamping of the block 73 by the fingers 117 and 118, the cam 143 operates to withdraw the positioning fingers 139 and 140 and the plate 108 is indexed so as to carry the properly positioned block into association with the carbon block inserting station 43.

The inserting station 43 as shown in Figs. 7, 16, 19 and 20 comprises a bracket 160 secured to the machine frame 55 supporting a rocker arm 161 at its upper end. One extremity of the rocker arm 161 supports a plunger 163 which is reciprocable within a slot 164 provided in the bracket 160 (Fig. 20). The outer terminal of a chute 166 terminates at the lower extremity of the slot 164 and is capable of guiding carbon blocks or inserts 167 of the types disclosed in Figs. 2, 4, and 5 to the lower end of the slot immediately beneath the plunger 163. When the porcelain block 73 has been indexed from the positioning station the aperture 142 thereof is carried into registration beneath the plunger 163 and at that instant the lowering of the plunger is effected by the operation of a cam 169 (Figs. 10 and 16) mounted upon the shaft 83 which causes the actuation of a rocker arm 170 connected with one extremity of the rocker arm 161. The lowering of the plunger 163 causes a latch 172 (Fig. 20) to be moved outwardly by engaging a stud 173, thereby permitting a carbon insert positioned within the slot 164 beneath the plunger 163 to be urged downwardly. A spring pressed finger 175 (Fig. 19) yieldingly engages one edge of the insert as it is being lowered so as to maintain the insert in proper registration with the aperture of the porcelain block positioned therebeneath. A pivoted arm 176 which carries a roller 177 will prevent the downward movement of the plunger 163 by engagement with the rocker arm 161 in the event that a pair of clamping fingers 117 and 118 are indexed beneath the inserting station without having a porcelain block associated therewith and will thus prevent a deposition of carbon inserts 167 upon the plate 108. When a porcelain block is in position beneath the clamping fingers, the upper surface of the clamping finger 117 is carried into engagement with the roller 177 so as to swing the upper end of the arm 176 out of the path of the rocker arm 161.

The carbon insert supply mechanism 44 comprises an inclined hopper 179 (Figs. 1, 14 and 15) mounted at the upper extremity of a vertical support 180 secured to the machine frame 55. A rotatable receiving plate 182 within the hopper 179 is operatively connected with a main drive shaft 70 by means of a pair of vertical, oppositely disposed shafts 183 and 184, the upper end of the shaft 183 having a gear connection with the receiving plate 182 and the lower end of the shaft 184 having a gear connection with the drive shaft 70. The operation of the receiving plate 182 is similar to the operation of the porcelain block receiving plate 57 in the hopper 53 and an annular marginal groove 186 provided in the receiving plate 182 is adapted to receive carbon inserts which become lodged therein and deliver said inserts to the entrance of the chute 166 which is connected at its lower extremity with the inserting station 43 as hereinbefore mentioned. A clutch mechanism 187 (Fig. 13) connects the shafts 183 and 184 and in the event that the receiving plate 182 meets with an abnormal resistance, such as might result from the jamming of the carbon inserts within the hopper 179, this clutch mechanism will automatically disconnect the shaft 183 from the shaft 184.

The carbon insert 167 having been properly inserted within its companion porcelain block 73, the positioning plunger 163 is withdrawn and the indexing of the plate 108 carries the assembled blocks into position to be discharged therefrom by a shifter bar 189 (Figs. 7 and 10) which is carried at the forward extremity of the rod 91, which also carries the aforementioned shifter bar 90. Before the assembled protector block can be ejected from the indexing plate 108, the fingers 117 and 118 must be released therefrom and this is accomplished by means of a projection 190 (Figs. 10 and 11) extending laterally and formed integral with the lower portion of a bearing member 111. This projection 190 is provided with a cam slot 192 which lies in the path of the rollers 129 carried by the cam blocks 128 and serves to carry the rollers outwardly as a clamped porcelain block is being indexed to its final position and thereby to effect the release of the clamping members so as to permit the shifter bar 189 to advance or eject the porcelain block and associated carbon insert from the indexing plate. As the assembled block and insert are advanced from the indexing plate 108 they are carried into association with a gauging mechanism 193, later to be described, and from this mechanism they are advanced step by step into and along a twisted groove or track 195 (Figs. 1 and 7). This twisted track 195 serves to overturn the parts before delivery to the transfer mechanism 45, the initial or upright position of the protector block as it enters the track 195 being shown in Fig. 4. As the parts reach the other extremity of the track 195, they will have rotated through 180° and assumed the inverted position shown in Fig. 5 and in that position will be advanced into a channel 196 of the transfer mechanism 45 (Figs. 1 and 21).

The transfer mechanism 45 is designed to receive the assembled parts from the twisted track 195 and to preclude the transfer of any of the porcelain blocks 73 not provided with carbon inserts 167 and also any blocks which might be improperly positioned. The block advanced within the channel 196 is subsequently carried into association with the forward extremity of a ram 198 of the transfer mechanism 45 (Figs. 21, 24 and 25) and directly beneath the forward extremities of a pair of pivoted levers 199 and 200. These levers 199 and 200 are movable with the ram 198 and are provided at their rearward extremities with locking surfaces or shoulders 203 and 204, respectively. When a porcelain block properly provided with a carbon insert is advanced beneath depending portions 205 and 206 of the levers 199 and 200, respectively, the ram 198 is urged forwardly and the rearward extremities of the levers 199 and 200 move away from the inclined surface of a fixed block 208 (Figs. 21 and 24) and a leaf spring 207 will cause the rearward end of the lever 199 to be urged upwardly until the forward end thereof engages the adjacent forward end of the lever 200 therebeneath. This movement is sufficient to carry the shoulder 203 clear of a cross bar 209 extending between a pair of ears 210 secured to the block 208, the block being supported by a bracket 211 (Fig. 21) mounted on the machine frame. The engagement of the forward end of the lever 199 with the lever 200 will tend to effect the downward movement of the lever 200, but the presence of a carbon insert beneath the depending portion 206 will prevent a movement of the lever 200 which would be sufficient to carry the shoulder 204 thereof upwardly into engagement with the cross bar 209. It will thus be clear that under such circumstances the ram 198 will be free to move forwardly so as to transfer the assembled block and insert into position immediately in front of a ram 212 (Figs. 1 and 21). As the ram 198 is carried forward in the above described manner side frames 213 (Fig. 21) which are pivoted at 214 and which pivotally support the levers 199 and 200 are lifted upwardly at their free forward ends by the engagement thereof with rollers 216. The raising of the side frames 213 in this manner effects the elevation of a member 217 (Figs. 21 and 24) which lies immediately adjacent the upper surface of the ram 198. This member 217, it will be observed, is provided with a depending portion 218 which serves as a guide for the blocks which are advanced from the channel 196 into association with the forward end of the ram 198 and obviously as this ram is carried forwardly, this depending portion 218 must be raised upwardly in order to clear the porcelain block upon the return stroke of the ram. In the event that a porcelain block is not provided with a carbon insert as it is fed into position beneath the portions 205 and 206 of the levers 199 and 200, the forward end of the lever 200 will be free to move downwardly upon the engagement therewith of the lever 199 as the ram 198 begins its forward stroke, sufficiently to cause the shoulder 204 to be carried into engagement with the cross bar 209. Likewise, if a porcelain block is advanced in front of the ram 198 in a position similar to that shown in Fig. 4, the depending portions 205 of the lever 199 will engage the upper surface of the porcelain block and hence the upward movement of the inner end of the lever 199 will not be sufficient to clear the shoulder 203 of the cross bar 209. The engagement of either of the shoulders 203 and 204 with the cross bar 209 prohibits the forward movement of the ram 198 and hence the porcelain block associated with the ram is not transferred but is advanced by the engagement therewith of a subsequent block to a discharge opening 220 (Fig. 21). The reciprocation of the ram 198 is occasioned through the operation of a cam 221 (Figs. 1 and 24) mounted upon the main drive 70. This cam 221 engages a roller on a lever 223 which is connected at its upper extremity with the ram 198 by means of a rod 224.

The endless conveyor 46 comprises a chain 225 which extends between a pair of sprocket wheels 226 and 227 (Fig. 29). Mounted upon the chain 225 are sections 228 which are provided with a plurality of block receiving carriers 229 (Figs. 21 and 28). The conveyor is adapted to be intermittently advanced by means of a cam mounted upon the shaft 70 which intermittently causes the actuation of a pawl and ratchet mechanism 231 (Fig. 29) operatively associated with the sprocket wheel 226. Subsequent to the advancement of a porcelain block and insert into association with the forward end of the ram 212, said ram is operated by means of a cam 232 on the shaft 70 and a pivoted lever 234 (Figs. 1 and 21) so as to advance the block and associated insert to one of the carriers 229 of the endless conveyor 46. The members thus delivered to the carriers 229 are advanced into association with the cementing mechanism 47.

The cementing mechanism 47 (Figs. 21, 22 and 23) includes a hopper 235 for retaining suitable cementing or bonding material in powdered form, such as lead borate, and is secured in position by means of a suitable standard 237. The lower end of a flexible conduit 238 supports a delivery head 239 which is provided with a pair of branch conduits 241 (Fig. 23). The delivery head 239 may be moved to the right and left (Fig. 22) within certain limits through the action of a cam 242 engaging with a roller carried at the lower extremity of a pivoted lever 243 which is connected at its upper extremity with the delivery head 239 by means of a link 245. When the delivery head 239 occupies the position shown in Fig. 22 the lower extremities of the branch conduits 241 are sealed by a leaf spring 246. Positioned beneath the delivery head 239 and adapted to register with the branch conduits 241 when said conduits are moved to the right are a pair of vertical conduits 248 (Fig. 23). These conduits 248 terminate within passageways 249 provided in a block 251 which is secured at the end of a pair of horizontally disposed support arms 252. These arms are secured at their other extremity to a slide block 254 which is adapted to be reciprocated vertically through the action of a cam 255, a coil spring 256 being interposed between the upper end of the slide block 254 and the top of a casing 258 in which the block is slidably mounted. In this connection it will be observed that both of the cams 242 and 255 are carried by a horizontally disposed drive shaft 259 (Figs. 1 and 22) which has a gear connection at one extremity with the main drive shaft 70. Referring to Fig. 23 it will be understood that the lower portion of the block 251 is reduced sufficiently to permit of its insertion within the recess 76 of a porcelain block 73 which has been advanced into position by the conveyor 46. The position of a porcelain block and associated carbon insert are shown in dotted lines (Fig. 23) for the purpose of indicating their relative position with respect to the lower end of the block 251 when the block has been carried to its lowermost position by the operation of the cam 255. When the block 251 has been lowered to such a position, the cam 242 operates to cause the delivery head 239 to be momentarily urged to the right (Fig. 22), thereby permitting a charge of cement from the hopper 235 to be delivered to the conduits 248 and thence into the passageways 249. It will be observed that the lower extremities of these passageways terminate at opposite sides of the carbon insert 167 with which the block 251 engages and hence the cement from within the passageways 249 will be delivered to a predetermined, localized area or position within the recess 76 of the porcelain block 73 adjacent its companion carbon insert, this position being clearly shown in Fig. 5. When a carrier 229 is advanced beneath the block 251 without the porcelain block and insert positioned thereon, obviously it would not be desirable to permit a charge of cement or bonding material to be delivered to the conduits 248. This condition is provided for by employing a stop 261 which is carried by and movable with the arms 252. Thus when a conveyor carrier 229 is advanced into position without supporting a block and associated insert, the lowering of the block 251 will not be limited by the presence of a carbon insert; hence, the stop 261 will be lowered sufficiently to occupy a position in the path of the support arm 262 (Fig. 23) upon which the delivery head 239 is mounted. The engagement of this support arm 262 with the stop 261 will positively prevent a delivery of a charge of cement to the conduits 248. Subsequent to this operation the conveyor 46 operates to advance the parts properly supplied with charges of cement into the electric furnace 48.

The heating furnace 48 (Fig. 1) is designed to subject the parts fed therethrough step by step to the proper heat and thereby cause a complete fusion of the charge of cement carried by each protector block unit to effect the binding of the parts thereof. As each protector block unit is advanced from the heating furnace its charges of cement will be in a plastic condition preliminary to its transfer to the insert straightening and cement cooling station 49.

Referring to Figs. 26 and 27 it will be observed that the conveyor carriers 229 advance protector blocks from within the furnace 48 to a position adjacent to the straightening and cooling station 49. At this position an ejector 264 actuated by a cam 265 on the shaft 259 and a bell crank 266 associated therewith operates to remove a block from a conveyor carrier 229 and advances said block beneath three similar plungers 268. A cam 269 operates a rocker arm 270 which actuates levers 272 supporting the plungers 268 through the medium of springs 273 and the plungers are thus brought into yielding engagement with the protector block positioned therebeneath. The middle plunger engages with the carbon insert and the two outer plungers engage the porcelain block, and in this way the proper positioning or straightening of the carbon insert within the porcelain block is effected and this position will conform to the position disclosed in Fig. 5. A valve 275 which is connected with a suitable supply of compressed air (not shown) is operated through the engagement of the rocker arm 270 with a spring pressed button 276 to permit a stream of air to pass through a pipe 277. This pipe 277 terminates at a point adjacent the plungers 268 and the stream of air from the pipe cools the cementing material while the carbon insert is being held in proper position by the plungers 268 as above described. The parts constituting the protector block are now completely assembled, the carbon insert 167 being secured within its companion porcelain block 73 by means of a bond of cement 279 (Fig. 5), and as the completely assembled protector blocks are advanced from the cooling station 49 they are finally delivered to a suitable receiving tray or receptacle 281 (Fig. 1).

Attention is now directed to clutch mechanisms 282 (Figs. 6 and 8) which serve to connect the shaft 69 with the shaft 83 when a handle 284 is turned in a counter-clockwise direction. By turning the handle 284 in a counter-clockwise direction or in other words raising said handle a crank 285 (Figs. 6, 31 and 32) mounted at the inner extremity of the shaft upon which the handle 284 is secured engages with the slotted end of a link 287, and causes an upright arm 288 pivoted at the opposite end of the link to be actuated. This arm 288 is connected with a yoke 290 which actuates the clutch mechanism 282 and thus when the handle 284 is raised the clutch mechanisms 282 are actuated so as to operatievly connect the shafts 69 and 83. A pivoted latch bar 291 is adapted to lock the link 287 when the link has been carried to the left (Fig. 31) and at this position a spring 293 causes the latch bar 291 to be carried into a recess 294 in the link 287. To disengage the clutch mechanism 282 it is only necessary to lower the handle 284 at which time a projection or finger 296 formed integral with the crank 285 disengages the latch bar 291 and a coil spring 297 of the clutch mechanism automatically causes the disengagement thereof.

A solenoid 299 (Figs. 6 and 32) is designed to disengage the latch bar 291. In the event that the mechanism for advancing the porcelain blocks to or away from the indexing mechanism 41 experiences abnormal resistance, such as might result from the jamming of the blocks, the solenoid 299 operates to disengage the clutch mechanisms 282. This is accomplished by the provision of a pair of spring contacts 300 and 301 (Fig. 10), the contact 300 being secured to the pin 103 and contact 301 to the block 102. When the machine is working under normal conditions the coil spring 105 maintains the spring contacts in spaced relation, but when the movement of the shifter bars 90 or 189 is obstructed, the block 102 will continue to move against the action of the coil spring 105 and the springs 300 and 301 will be carried into contact with each other. The contacting of these springs energizes the solenoid 299 which is connected with a suitable source of current supply (not shown) and the core of said magnet is carried upwardly into engagement with the latch bar 291.

The gauging mechanism 193 (Figs. 7, 10 and 30) is operatively connected with a solenoid 303 which functions similarly to the solenoid 299. This gauging mechanism operates to preclude the entrance into the twisted track 195 of a porcelain block in which carbon inserts have been improperly positioned or inserted. Thus, for example, if a carbon insert for some reason is positioned within a companion porcelain block so that it projects above the upper portion of the block, this insert will be carried into engagement with a depending metallic lug 304 which is supported by a spring contact 305. If the lug 304 is moved upwardly to a sufficient degree the circuit through the solenoid 303 will be closed and this will result in the upward movement of a core therefrom. The upward movement of this core acting through a series of levers and cranks will effect the retraction of a latch 307, thereby permitting a guide member 308 which supports the porcelain block to swing downwardly of its own weight. This results in the delivery of the block having an imperfectly associated insert into a suitable chute 309. A cam 311 (Fig. 10) mounted on the shaft 83 operates a bell crank 312 which causes the immediate return of the guide member 308 to its normal latched position to receive the porcelain block next advanced.

Having described in detail the functional characteristics of the principal parts of the protector block assembling machine, a brief statement of operation will now be presented. Power is transmitted to the main drive shaft 70 by a chain 314 which is connected with any suitable source of power supply (not shown) and upon raising the handle 284 the clutch mechanisms 282 are engaged so as to operatively connect the shafts 63 and 83. The porcelain blocks 73 supplied from the hopper 53 are fed downwardly through the chute 79 and are individually transferred by the ram 81 in operative association with the shifter bar 90. The shifter bar 90 operates to advance the block to the indexing mechanism 41 into position beneath the pair of clamping fingers 117 and 118 (Fig. 7). The initial indexing movement of the plate 108 carries the block into association with the positioning station 42 where the fingers 139 and 140 operate to properly position the block and immediately subsequent to this positioning operation, the clamping fingers are carried into engagement with the block. A subsequent indexing movement carries the block into association with the carbon inserting station 43 at which point a carbon insert which has been fed from the supply mechanism 44 through the chute 166 to the lower end of the slot 164 is delivered by the action of the plunger 163 into the aperture 142 of the porcelain block now positioned thereneath. The block is then indexed to a third or final position during which time the clamping fingers 117 and 118 are released and the shifter bar 189 operates to advance the block to the gauging mechanism 193. The blocks which are not rejected at the gauging mechanism 193 are advanced through and overturned within the twisted track 195 and delivered to the channel 196 of the transfer mechanism 45. This mechanism operates to permit the transfer of only those blocks which are properly positioned and properly provided with carbon inserts. In this connection attention is directed to a bell crank 315 (Fig. 21) which operates to prevent the operation of the transfer ram 198 in the event that a block for some reason is only partially advanced into position beneath the transfer mechanism. Under such circumstances the block will be carried into engagement with an arm 316 of the bell crank 315 when the ram 198 begins its forward movement, and this will cause the extremity of an arm 317 to be moved into a notch 318 provided in the side of the ram 198 so as to positively prevent the continued movement of the ram. The ram 212 delivers the blocks to carriers 229 of the endless conveyor 46 which carries said block into association with the cementing station 47. At this station cement or bonding material in powdered form is delivered in proper localized areas adjacent opposite sides of the carbon insert and the block is then fed in this condition to the heating furnace 48 wherein the cement is properly fused to effect the binding of the parts. As the block emerges from the furnace it is delivered to the insert straightening and cement cooling station where the carbon insert is properly positioned with respect to its companion porcelain block. As shown in Figs. 26 and 27 a reciprocable brush 321 is provided which operates to clean each carrier 229 and brush any of the particles removed from the carriers into suitable chutes 322.

Although the invention as herein illustrated and described is particularly well adapted for use in connection with apparatus for assembling protector block parts, it should be understood that the novel features thereof are capable of other applications and should be limited only by the scope of the appended claims.

What is claimed is:

1. In apparatus for assembling members with companion apertured members, an inserting mechanism operable to insert a member within the aperture of a companion member, bonding material supplying means for supplying a charge of material to a predetermined localized area of adjacent portions of members preliminarily assembled by the inserting mechanism, actuating means therefor, and means for heating the bonding material to effect the fusion thereof.

2. In apparatus for assembling insert members with companion apertured members, an inserting mechanism, means for retaining an indiscriminately arranged supply of apertured members and for advancing properly positioned members therefrom, means for delivering properly positioned apertured members to the inserting mechanism, means for feeding insert members to the inserting mechanism, and means for supplying a bonding material to the members assembled by the inserting mechanism.

3. In apparatus for assembling members with companion apertured members, an inserting mechanism operable to insert a member within the aperture of a companion member, means for applying fusible bonding material to the members preliminarily assembled by the inserting mechanism, actuating means for the material applying means, and means for fusing the bonding material applied to the members.

4. In an apparatus for assembling members, a preliminary assembling mechanism, means operable to supply a charge of fusible bonding material to the members preliminarily assembled, means for heating the charge of bonding material to fuse the same, and means directing a current of air against the bonding material to cool and harden the same.

5. In apparatus for assembling insert members with companion apertured members, an inserting mechanism, means for positioning an indiscriminately arranged supply of apertured members in predetermined relation and for delivering the same in predetermined position to the inserting mechanism, means for positioning an indiscriminately arranged supply of insert members in predetermined relation and for delivering the same in predetermined position to the inserting mechanism, and means for supplying bonding material to the members assembled by the inserting mechanism.

6. In apparatus for assembling protector block parts, an inserting mechanism, means for positioning an indiscriminately arranged supply of apertured blocks in predetermined relation, means for delivering the positioned blocks to the inserting mechanism, and means for positioning an indiscriminately arranged supply of inserts in predetermined relation and for advancing the same to the inserting mechanism.

7. In an assembling apparatus, means for advancing in predetermined relation apertured members from an indiscriminately arranged supply thereof, an inserting mechanism, means for positioning the advanced members in predetermined relation to the inserting mechanism, said inserting mechanism being operative to insert companion members in said apertured members to form a preliminary assembly, means for applying a fusible bonding material to the preliminarily assembled members, and means for heating the bonding material applied to the members to fuse the same.

8. In an assembling apparatus, means for individually advancing in predetermined position apertured members from an indiscriminately arranged supply, means for inserting companion members in said apertured members to form a preliminary assembly, means for applying a fusible bonding material to the preliminarily assembled members, means for heating the bonding material applied to the members to fuse the same, and means for rapidly cooling the bonding material.

9. In an assembling apparatus, means for individually advancing in predetermined position apertured members from an indiscriminately arranged supply, means for inserting companion members in said apertured members to form a preliminary assembly, means for applying a fusible bonding material to the preliminarily assembled members, means for heating the bonding material applied to the members to fuse the same, means for accurately positioning the companion members with respect to their corresponding apertured members, and means for cooling the bonding material to permanently fix the relative positions of the members.

10. In an apparatus for assembling apertured members with companion members, means operative to insert the companion members in apertures of the apertured members when the latter are in upright position, means operative to apply a bonding material to the assembled members when the assembled members are in inverted position, and means for advancing the assembled members from the inserting means to the bonding material applying means and for overturning the assembled members during such advancement.

11. In an apparatus for assembling apertured members with companion members, means operative to insert the companion members in apertures of the apertured members when the latter are in upright position, means operative to apply a bonding material to the assembled members when the assembled members are in inverted position, means for advancing the assembled members from the inserting means to the bonding material applying means and for overturning the assembled members during such advancement, and means for accurately positioning the companion members within the apertured members after the bonding material has been applied.

12. In an apparatus for assembling members, a bonding material applying mechanism, a series of moving carriers for passing preliminarily assembled members into operative relation to said mechanism, means normally actuating said mechanism in timed relation with the movement of said carriers, and means rendering said actuating means inoperative when none of the preliminarily assembled members is in operative relation to said mechanism.

13. In an assembling apparatus, means operative to preliminarily assemble insert members with companion apertured members when the latter are in upright position, a mechanism for applying bonding material to the preliminarily assembled members when the assembled members are in inverted position, means for transferring the preliminarily assembled members from the assembling means to the material applying mechanism and for overturning the preliminarily assembled members during such transfer, and means for preventing the transfer by said transferring means of members not properly assembled.

14. In an assembling apparatus, means operative to preliminarily assemble insert members with companion apertured members when the latter are in upright position, a mechanism for applying a fusible bonding material to the preliminarily assembled members when the assembled members are in inverted position, means for transferring the preliminarily assembled members from the assembling means to the material applying mechanism and for overturning the preliminarily assembled members during such transfer, means for preventing the transfer by said transferring means of members not properly assembled, and means for heating the bonding material applied to the members to fuse the same.

In witness whereof, I hereunto subscribe my name this 31 day of January A. D., 1927.

ROBERT HOFSTETTER.